United States Patent [19]
Dozier

[11] 3,790,227
[45] Feb. 5, 1974

[54] BRAKE CONTROL SYSTEM
[75] Inventor: Leonard C. Dozier, Birmingham, Mich.
[73] Assignee: North American Rockwell Corporation, Pittsburgh, Pa.
[22] Filed: June 30, 1972
[21] Appl. No.: 268,070

[52] U.S. Cl. .......... 303/21 BE, 303/20, 303/21 AF, 303/21 P
[51] Int. Cl. .............................................. B60t 8/12
[58] Field of Search. 188/181; 303/20, 21; 324/162; 340/52 B, 262

[56] References Cited
UNITED STATES PATENTS

| | | | |
|---|---|---|---|
| 3,017,145 | 1/1962 | Yarber | 303/21 BE |
| 3,574,417 | 4/1971 | Howard et al. | 303/20 X |
| 3,042,136 | 7/1962 | Haunen | 188/181 R X |
| 3,672,730 | 6/1972 | Burckhardt et al. | 303/21 BE |
| 3,532,393 | 10/1970 | Riordan | 303/20 X |
| 3,652,136 | 3/1972 | Schlitz et al. | 303/20 X |
| 3,666,326 | 5/1972 | Marouby | 303/20 X |
| 3,494,671 | 2/1970 | Slavin et al. | 303/20 X |
| 3,647,267 | 3/1972 | Scharlack | 303/20 X |
| 3,713,705 | 1/1973 | Michellone et al. | 303/20 X |
| 3,578,819 | 5/1971 | Atkins | 303/20 UX R |
| 3,542,437 | 11/1970 | Leiber et al. | 303/20 X |
| 3,637,264 | 1/1972 | Leiber et al. | 303/20 X |
| 3,674,320 | 7/1972 | Howard et al. | 303/20 X |
| 3,398,995 | 8/1968 | Martin | 303/20 X |

*Primary Examiner*—George E. A. Halvosa
*Assistant Examiner*—Stephen G. Kunin
*Attorney, Agent, or Firm*—H. Fredrick Hamann, Rolf M. Pitts and John R. Bronaugh

[57] ABSTRACT

A vehicle brake control system effective to modulate braking torque in response to wheel acceleration and deceleration signals to provide an average braking torque to establish a desired slip ratio between the vehicle tires and the road surface. Upon detection of excessive wheel deceleration during braking, the braking torque is reduced sufficiently to permit the wheel to accelerate. After a predetermined time or upon detection of a predetermined wheel acceleration the braking torque is re-established either at the full level selected by the operator or at a programmed lower level which is increased upon detection of decreased wheel acceleration. The reapplication of braking torque will ordinarily cause the wheel to decelerate with a repetition of the cycle.

7 Claims, 3 Drawing Figures

BRAKE CONTROL SYSTEM

BACKGROUND OF THE INVENTION

In recent years it has been generally recognized that vehicle operators cannot provide optimum vehicle braking performance, particularly in view of the increased size of vehicle brakes which is now sufficient to lock the wheels if the operator applies full braking pressure.

Investigations have established that while the wheel lock condition may bring a vehicle to a stop in a minimum distance, it will inevitably be accompanied by loss of directional control, which under most conditions creates a greater hazard than a slight extension of the stopping distance.

It has also been learned that if the braking torque is maintained at a level which maintains the vehicle tires in rolling contact with the road surface, but with approximately 20 to 50 percent slip, the vehicle will be brought to a stop in a distance approaching the theoretical minimum while retaining full directional control.

The prior art is replete with attempts to provide an anti-skid brake control system which overrides the operator control to prevent either wheel lock or excessive wheel slip without unacceptable extension of the vehicle stopping distance. In general these prior systems include a valve arrangement interposed between the operator controlled brake pedal and the brake and effective under certain conditions to reduce the pressure applied to the brake below that called for by the operator. It has been proposed to actuate the valve arrangement in response to signals derived from a comparison of deceleration of one or more wheels with the deceleration of the vehicle, or from a comparison of the speeds of one or more selected vehicle wheels or from a signal derived from the deceleration of one or more vehicle wheels. Usually the systems are effective to pulse the brakes or to establish a cycle between "brake ON" and "brake OFF" conditions.

While these prior systems do provide a measure of control, they usually permit excessive deviations from the desired braking conditions resulting either in excessive stopping distance or excessive wheel slippage or provide jerky or uneven operation which interferes with effective vehicle control. Often the prior systems are bulky, unduly complicated, or expensive, and are not sufficiently rugged to withstand actual operating conditions. Many prior systems also permit wheel lock at one side of the vehicle resulting in vehicle instability.

SUMMARY OF THE INVENTION

It is the principal purpose and object of the present invention to provide improved brake control systems which are effective automatically to establish and maintain braking force at a value which will ensure minimum stopping distance with full retention of directional control and directional stability under a wide variety of operating conditions, the control system being relatively inexpensive to manufacture and install, and being rugged, trouble-free, and reliable.

In accordance with a preferred form of the invention, a separate control system is provided for each vehicle axle, although in cases where the increased cost is warranted, individual control systems can be provided for each wheel. The system includes means for producing a signal indicative of the acceleration or deceleration at each wheel on the axle. Preferably the signal from the slower wheel in the group is effectively rejected under most conditions and the signal from the faster wheel is utilized as the basic control signal. The speed of the slower wheel is constantly monitored and under certain conditions, the signal from the slower wheel is used to modify the braking system. The control signal is supplied to a logic circuit which modulates the pressure supplied to the brakes at both wheels.

During normal braking the control system is powered but exercises no control function. If the vehicle operator applies the brakes with excessive torque which creates undesirable wheel slip, the excessive deceleration of the wheel will produce a control signal which is transmitted by the logic circuit to a control valve as a "brake OFF" signal. Braking torque will continue to decrease until it is less than the road torque, thus permitting the wheel to accelerate. When the acceleration of the wheel reaches a predetermined value a first "brake ON" signal (hereinafter termed $ON_1$) is produced which usually results in partial brake reapplication. The actual level of $ON_1$ brake pressure is a function of the brake pressure existing when the "brake OFF" signal was generated and the maximum rate of wheel deceleration. The brake pressure established at the $ON_1$ command is usually low enough that the wheel continues to accelerate toward a no slip or synchronous condition. When this occurs, wheel acceleration will drop below a predetermined threshold, producing a further "brake ON" command ($ON_2$ command) which increases the pressure applied to the brakes as a result of the $ON_1$ command. This will ordinarily cause the wheel again to decelerate and if the resulting deceleration exceeds a predetermined threshold a further "brake OFF" signal will be produced and the cycle will be repeated. However, in each succeeding cycle the pressure supplied to the brake at each $ON_1$ command is related to the pressure applied as a result of the preceeding $ON_2$ command, as explained in greater detail below.

If the pressure supplied at any ON command is insufficient to decelerate the wheel, brake pressure will continue to increase up to the full pressure supplied by the vehicle operator.

The brake control system will usually operate in the foregoing manner when the vehicle is lightly loaded or is traveling on a low coefficient surface. When the opposite conditions obtain, the $ON_1$ mode is bypassed and the $ON_2$ mode is established a predetermined short time interval following brake OFF signal. This mode of operation minimizes the brake OFF time and accordingly, reduces stopping distance.

Thus, the brake control system of the present invention functions, during a braking cycle in which the operator calls for excessive brake pressure, to provide a series of "brake OFF" and "brake ON" command signals, each "brake ON" signal commanding a brake pressure which is a predetermined percentage (approximately 10 – 100 percent) of the command pressure that existed when the "brake OFF" command occurred on the previous wheel cycle.

It is an important feature of the control system that brake reapplication is commenced before the wheels reach synchronous speed, thus minimizing loss of braking force.

The result of this action is that the braking action closely approximates the ideal slip condition to assure bringing the vehicle to rest in a minimum distance with retention of full directional control and lateral stability.

As explained below the control system exercises no control function in the absence of excessive wheel slip or in any event when the speed of the vehicle is below a predetermined low speed such as five miles per hour. It is electrically and mechanically fail safe.

DESCRIPTION OF PREFERRED EMBODIMENT

Referring now more particularly to the drawings, the specific embodiment of the brake control system of the present invention herein illustrated is particularly adapted to modulate the action of pneumatically operated brakes of conventional construction.

Figure 1:
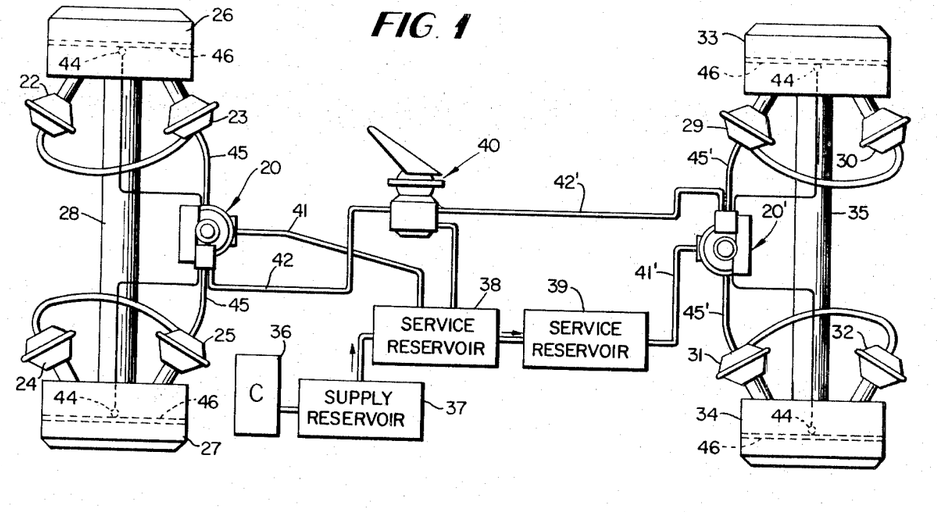
FIG. 1 is a diagrammatic illustration of a typical application of the control system.

Referring now more particularly to FIG. 1, the control system of the present invention is preferably utilized to control the brakes on all wheels mounted on one axle. In the illustrated embodiment, a control valve, indicated generally at 20, controls the operation of the paired actuators 22-23 and 24-25 associated with brake mechanisms 26 and 27 of the wheels on the front axle 28. An identical control valve 20' controls the paired actuators 29-30 and 31-32 associated with the brake mechanisms 33 and 34 on the rear vehicle axle 35.

The remainder of the brake system, which is essentially conventional, includes the usual compressor 36 which delivers air under pressure to a supply reservoir 37 and thence to series connected service reservoirs 38 and 39, the former being connected to supply air under service pressure, for example, 100 psi, through line 41 to the control valve 20 associated with the front axle, and the latter being connected to supply service air through line 41' to the control valve 20' associated with the rear axle.

The service reservoir 38 is also connected to supply air under pressure to the usual treadle valve 40. When the operator depresses the treadle valve 40, air under the selected pressure is delivered to the control chambers of the control valves 20 and 20' through lines 42 and 42', respectively. Air, at a pressure level determined by the valves 20 or 20' is delivered to the brake actuators through lines 45 and 45'. When the treadle valve is released it vents the pressure in the control chamber. The control valves 20 or 20' then vent the brake actuators.

The valves 20 and 20' are preferably of the form disclosed in U.S. Pat. No. 3,743,364 issued to A. B. Holmes and owned by applicant's assignee.

The control system includes sensors 44 mounted on the axles 28 and 35 adjacent notched discs 46 rotatable with each of the wheels, the sensors generating signals indicative of the angular velocity of the left and right wheels, respectively. The sensing devices 44 may be of any conventional form and are effective to generate signals, preferably a train of pulses, indicative of the angular velocity of the wheels. Preferably the sensors produce signals having a frequency from 25 to 1250 hz, which corresponds to wheel velocities of from 15 rpm to 750 rpm or vehicle speeds of from 2 – 90 mph. These signals from the sensors 44 for each axle are supplied to a computer unit carried by the housing of the valves 20 and 20' for that axle. The velocity signals are processed and under certain conditions actuate the valves to modify the brake pressure applied by the operator through the treadle valve 40 in a manner explained in greater detail below.

Normally the modulating valves 20 and 20' exert no control function and permit the pressure applied by the vehicle operator to be transmitted unchanged to the individual brake chambers. If, however, the control system detects an incipient skid condition and produces a brake OFF signal, the valve is actuated to dump the pressure in the individual brake actuators to release the brakes and permit the affected wheels to begin to accelerate toward synchronous speed. When the wheel acceleration reaches a predetermined level, or after a fixed time interval, the $ON_2$ or the $ON_1$ and $ON_2$ signals are generated resulting in partial or full brake application. The $ON_1$ and $ON_2$ signals are of such character that they control the ON-OFF time of a solenoid 21 and 21' (FIG. 3) carried internally of the respective valves 20 and 20' as more fully explained in the abovementioned copending application. When the solenoid is energized continuously the brake pressure is reduced to zero. When the solenoid is deenergized, the pressure becomes that signalled by the brake operator. By cycling the valve ON-OFF the pressure at the brake chambers will assume a short-term time-averaged value which is a function of the ratio of solenoid ON time to OFF time. The valve is operated in this manner to establish the brake pressures required at the $ON_1$ and $ON_2$ signals.

As stated above, the control system is arranged on an axle by axle basis, that is, signals indicative of the angular acceleration or deceleration of the two wheels or wheel groups on a particular axle are fed to a control system which usually selects the faster wheel as the control base. The performance of this wheel is then used to generate signals which actuate the solenoid 21 and 21' to modulate the action of valve 20 or 20' which regulates the pressure applied to the brakes at both wheels on the axle.

Figure 3:
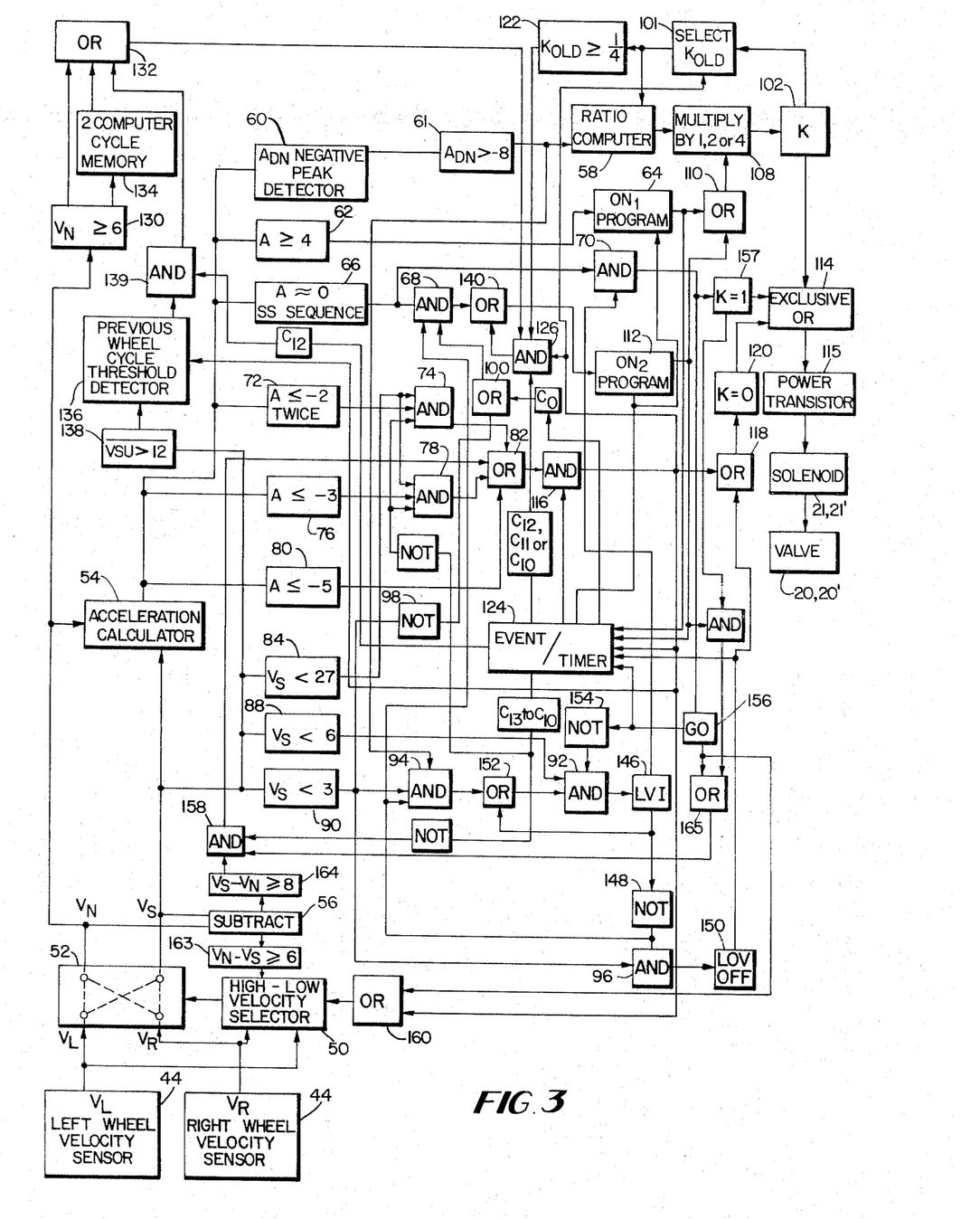
FIG. 3 is a block diagram of the principal electrical components of the control system.

As used herein, $V_L$ is the velocity signal from the sensor 44 at the left wheel on one axle, $V_R$ is the velocity signal from the sensor at the opposite or right wheel on the same axle, $V_S$ is the velocity of the selected wheel, normally the faster wheel, $V_N$ indicates the velocity signal from the non-selected, usually slower wheel, A is the change of velocity of the selected wheel, positive values of A indicating wheel acceleration and negative values indicating wheel deceleration. The term $A_{DN}$ is the most negative value of wheel acceleration in the present braking cycle. The numerical values as used herein and given in FIG. 3 are logic counts. Nevertheless, they correspond generally to the actual values of velocity in mph and acceleration, i.e., a count of 2 indicates approximately two g acceleration, and a count of −8 indicates approximately an 8g deceleration.

Through the use of conventional circuitry, omitted for clarity, the control system has a basic cycle time of 40 ms. This basic cycle may be termed the "computer cycle."

The time cycle between two successive "brake OFF" signals may be termed the "braking cycle."

The signals $V_L$ and $V_R$ generated by the sensors 44 are fed to a high-low velocity selector 50, which periodically compares $V_L$ and $V_R$ and actuates a switch 52 to transmit as $V_s$ the signal from the faster wheel to an acceleration calculator 54 which is so constructed that at the end of each computer cycle it produces a logic count indicative of the acceleration or deceleration of the faster wheel during the 40 ms computer cycle. This result is accomplished by counting and storing the $V_S$ pulses generated in each computer cycle and then comparing the stored count with the count in the next computer cycle, the differences being noted and transmitted as acceleration or deceleration signals.

Periodically, through a circuit described below, the unit 56 compares the signal $V_N$ from the non-selected slower wheel with the signal $V_S$ from the selected faster wheel. Upon detection of the condition $V_S - V_N \geq 8$, or the condition $V_N - V_S \geq 6$, velocity difference signals are generated for purposes described below.

The acceleration counts produced by the unit 54 are fed to a series of detector or storage devices 60, 62, 66, 72, 76 and 80. The output of the detector 60 constantly represents the maximum rate of deceleration ($A_{DN}$) detected during a particular braking cycle. Gate system 61 distinguishes between values of $A_{DN}$ greater than −8 and values equal to or less than −8 and transmits an appropriate signal to the ratio computer 58 described below. Detector 62 passes a signal to the $ON_1$ programmer 64 when the acceleration signal is equal to or greater than 4 g's. Detector 66 passes a signal to the $ON_2$ programmer whenever the acceleration is essentially zero in three successive computer cycles. The detector transmits a signal to the AND gate 74 whenever the acceleration signal has a value equal to or less than −2 during two successive computer cycles. The detector 76 transmits a signal to the AND gate 78 whenever the acceleration signal is −3 or greater and the detector 80 transmits a signal to the OR gate 82 whenever the acceleration signal has a value of −5 or greater.

The signal $V_S$, directly indicative of the velocity of the selected wheel, is fed to a detector 84 which passes a signal to the AND gates 74 and 78 whenever the wheel velocity count is less than 27. The velocity signal is also transmitted to detectors 88 and 90, the former transmitting signal to AND 92 when the velocity count is less than 6 and the latter transmitting a signal to AND gates 94 and 96 and through NOT gate 98 and OR gate 100 to the AND gate 68 whenever the velocity count is less than three.

It is a feature of the present invention that the commanded pressure with which the brakes are reapplied following a "brake OFF" command varies depending on the conditions existing when the brake OFF signal was generated and subsequent values of maximum deceleration detected prior to the brake reapplication. The basic value of the commanded brake reapplication pressure is determined by the ratio computer 58 which receives an input from the unit 61 indicating peak values of deceleration in the braking cycle and an input from a unit 101 which supplies a value termed $K_{OLD}$.

K has a minimum value of zero, indicating full brake release, and a maximum value of 1, indicating full brake application, and a selected set of fractional values, for example, 1/16; ⅛; ¼; ½ indicating partial brake application. The value of K computed in the previous brake cycle is stored in the unit 102. At the appropriate time in the cycle, as explained below, the value of K stored in the device 102, called $K_{OLD}$, is transferred to the unit 101 where it is now remembered as $K_{OLD}$ and then transferred to the ratio computer 58.

The ratio computer, which is of essentially conventional construction, is effective to select a new ratio in accordance with the following table:

|  | $A_{DN} > -8$ | | | | $A_{DN} \leq -8$ | | | |
|---|---|---|---|---|---|---|---|---|
| $K_{OLD}$ | ⅛ | ¼ | ½ | 1 | ⅛ | ¼ | ½ | 1 |
|  | 1/16 | ⅛ | ¼ | ½ | 1/16 | 1/16 | ⅛ | ¼ |

The ratio signal delivered by the ratio computer 58 is blocked by the multiplier 108 until a signal is received through the OR gate 110 from the $ON_1$ programmer 64 or the $ON_2$ programmer 112. When such signals are received, the ratio is transferred to the multiplier 108 which may increase the ratio as explained below. The modified K is transferred through an exclusive OR gate 114 to a power transistor 115 which establishes the duty cycle of the solenoid 21 or 21' in accordance with the selected value of K.

Thus the duty cycle of the solenoid 21 or 21' is a function of $A_{DN}$ and $K_{OLD}$. For example, referring to the table above given $A_{DN}$ greater than −8, $K_{OLD} = ¼$ the duty cycle of the solenoid 21 or 21' will be such that in each 40 ms computer cycle the ratio of voltage OFF time to 40 ms. will be 1:8 with the result that a relatively low partial brake pressure (approximately 20 percent) will be established at the brake actuators when the signal is in effect.

The operation of the remaining circuitry will best be understood by a consideration of the overall operation of the system, which will now be described.

The system may be continuously powered or may be connected to a suitable power source, not shown, in series with the brake stoplights, not shown. During normal brake application, the system is powered but exerts no control function.

The control system produces a brake OFF command which results in full time energization of the solenoid 21, 21' and consequently signals full brake release under either of two major conditions of wheel deceleration, each of which indicates excessive wheel slip. More specifically, the system produces a brake OFF command when wheel deceleration is sufficiently high to produce unacceptable wheel slippage indicating an incipient or actual wheel lock regardless of the speed of the vehicle or other factors. The system is also effective to produce a brake OFF signal when a lower rate of wheel deceleration is detected and the vehicle is moving at a slow rate or is heavily loaded, since such a combination of conditions also indicates objectionable wheel slip and incipient or actual wheel lock.

It will be noted that when the unit 80 receives and transmits a signal indicating that wheel deceleration is equal to or less than −5 the signal is passed through the OR gate 82 to the AND gate 116 to the OR gate 118, thence to a device 120 which sets K = 0, the signal being transmitted to the exclusive OR gate 114, thence to the solenoid 21, 21' as a full brake release signal. Thus, detection of deceleration less than −5 is the only condition necessary to command full brake release.

The brake OFF signal is also generated when the device 84 transmits a signal indicating that wheel velocity is less than 27 counts (vehicle velocity approximately 25 mph) and device 72 transmits a signal indicating that wheel deceleration is equal to or less than −2 in two consecutive computer cycles. When these conditions are detected, a signal is transmitted through the AND gate 74 and through the OR gate 82, and thence to the solenoid 21, 21' to signal full brake release. Alternatively the low speed signal from the unit 84, if accompanied by a signal from the unit 76, indicating deceleration equal to or less than −3 in one computer cycle, satisfies the AND gate 78 transmitting a signal through OR gate 82 and AND gate 116 to produce the $K = 0$ or brake OFF command.

Actual experience has demonstrated that these conditions or a combination of these conditions invariably indicate excessive brake torque producing excessive wheel slip or wheel lock. In all cases the system response to these conditions is the same, i.e., it signals full brake release. When the braking cycle is initiated the value of $K_{OLD}$ will always be one.

The brake OFF signal is also used to activate the device 101 to transfer the value of $K_{OLD}$ to the ratio computer 58 and to the device 122. The brake OFF command also starts the event timer 125 which runs through 13 counts ($C_{13}, C_{12} - C_0$) each count representing the passage of 40 ms, the basic computer cycle time. The several functions of the event timer, which is stopped and restarted on each change of control mode, will appear as the description proceeds.

Figure 2:
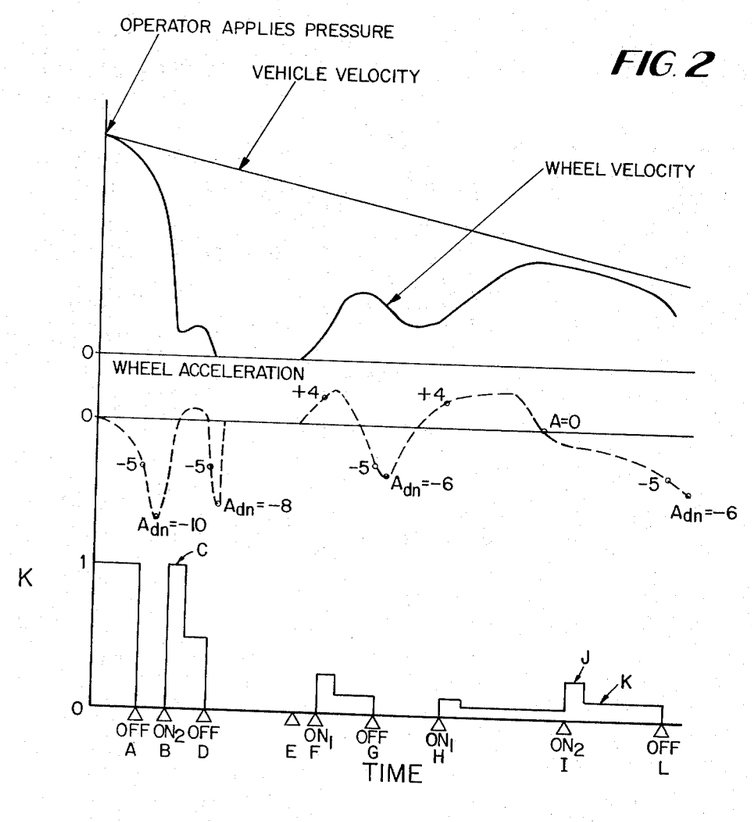
FIG. 2 is a chart illustrating the performance of the control system under typical conditions.

FIG. 2 shows conditions of wheel velocity, vehicle velocity, wheel acceleration and commanded brake pressure ratio in a typical series of braking cycles during a period in which the operator initially calls for excessive braking torque and maintains the excessive braking torque.

At the instant of brake application the wheel velocity corresponds to the vehicle velocity. Assuming excessive brake application, the wheel speed begins to decrease rapidly with an increasing rate of deceleration. When the deceleration reaches a value of −5 the brake OFF signal is generated and the commanded brake pressure falls to zero. This occurs at point A, FIG. 2. The actual brake pressure, particularly in a pneumatic system, will continue to increase for a few milliseconds and then begin to decay very rapidly, the actual rate of decay being dependent upon a number of mechanical factors. Following the brake OFF signal and the commanded full release of the brakes the wheels may continue to decelerate because of the inherent delay in the response of the pneumatic brake system and mechanical factors. The deceleration of the wheel after the brake OFF signal is continuously monitored and if the value exceeds the value which generated the brake OFF signal the new higher value will be stored as $A_{DN}$ in the unit 60. In the example shown in FIG. 2 it is assumed that the wheel deceleration $A_{DN}$ reaches a peak value less then −8, i.e., −10.

It will be understood that the wheels continue to exert substantial braking force even though the brake pressure may be reduced to zero during the period of acceleration of the wheel, following the brake OFF signal. This braking force decreases as the acceleration of the wheel decreases and reaches zero as the wheel reaches synchronous speed. If, as in many prior systems, the reapplication of substantial brake pressure is delayed until the wheel displays substantial acceleration or approaches or reaches synchronous speed, the braking cycle will include periods in which the wheel exerts no retarding force with the result that the stopping distance is unacceptably increased, and the vehicle experiences periods of zero deceleration producing jerky vehicle motion.

Because of the inherent time lag in the mechanical portion of the system, it is essential that the reapplication of brake pressure be initiated as rapidly as possible so that substantial brake torque will be available as the wheel reaches synchronous speed.

The present invention achieves these objectives in an unusually effective manner while at the same time avoiding premature or excessive brake reapplication which might cause loss of vehicle stability.

The control system provides for two modes of brake reapplication, ($ON_1$ and $ON_2$) and two primary methods for initiating the $ON_2$ mode, the selection of a particular mode and method depending on the conditions obtaining when the brake OFF signal was generated. The $ON_1$ mode produces partial brake application and the $ON_2$ mode restores full treadle pressure.

Generally when the vehicle is lightly loaded or is traveling on a low coefficient surface, brake reapplication is instituted by activating the $ON_1$ programmer 64 as a function of wheel acceleration. Under other conditions, that is, when the vehicle is heavily loaded and is traveling on a high coefficient surface, brake reapplication is instituted by activating the $ON_2$ programmer 112, primarily as a function of time.

Essentially, the system distinghishes between conditions requiring the application of the $ON_2$ command as a function of time and the deferred application of the $ON_1$ command as a function of wheel acceleration, on the basis of the noted value of $K_{OLD}$. Experience has shown that when the value of $K_{OLD}$ is equal to or greater than one-fourth the $ON_2$ program should be initiated as function of time. When this condition is not present, the $ON_1$ program is initiated as a function of wheel acceleration. In the example of FIG. 2 it is assumed that the vehicle is partially loaded so that a pressure command of $K \geq \frac{1}{8}$ will be sufficient to eventually decelerate the wheel.

In the assumed example illustrated in FIG. 2, the ratio computer will receive an input from the device 61 indicating that $A_{DN}$ is less than −8. It will also receive an input indicating that $K_{OLD}$ equals 1. With these inputs the ratio computer will select the value of ¼ in accordance with the table given above. This signal is delivered to the unit 108 which multiplies by two and thence to the unit 102, which passes the signal ultimately to the solenoid 21, 21', establishing a program of partial brake application at a commanded pressure ratio of ½, which is approximately 75 percent full brake application.

The programmer 112 is so arranged that the pressure ratio signalled at the $ON_2$ command is re-doubled during the first forty ms cycle following the $ON_2$ command to accelerate the buildup of brake pressure as shown at point C in FIG. 2. As also shown in FIG. 2, the ratio selected by the computer 58 is thereafter transmitted at its doubled value to the unit 102. In this example it is assumed that the resulting pressure is sufficient to produce an OFF command at point D.

After the "OFF" occurs at point D the wheel is shown in this case to be at such a low velocity that it locks briefly until point E, where it begins to rotate. This momentary lock will inhibit the $ON_2$ mode of operation at low wheel velocity in a manner to be described later, so that no pressure will be applied until commanded by the $ON_1$ method of application.

When the wheel acceleration reaches a value equal to or greater than four as at point F, FIG. 2, the device 62 will transmit a signal to the $ON_1$ programmer 64, the output of which is transmitted through the OR gate 110 to the multiplier 108. The output of the $ON_1$ programmer also stops and restarts the event timer 124, which in turn supplies its timer count to the programmer 64.

In this example the resulting pressure is still high enough to decelerate the wheel again, so that an OFF command occurs at point G.

On the next cycle the partial brake application effected by the $ON_1$ program at point F is sufficiently low to permit the wheels to approach synchronous speed rapidly at which time the wheel acceleration will be essentially zero in at least three successive computer cycles. When this occurs, (at point I) the unit 66 will deliver a signal to the AND gate 68. The AND gate will be satisfied if it receives a signal from the units 90 and 98 indicating that velocity is not less than three and a signal from the low velocity inhibit unit 146, described below, and the NOT gate 148 indicating that the low velocity inhibit is not in effect.

When these conditions are met the resulting signal from the AND gate 68 is transmitted to the $ON_2$ programmer 112 through the OR gate 140 and the $ON_2$ program is initiated, as shown at point I in FIG. 2. The multiplier device 108 responds to the initial signal from the $ON_2$ programmer by multiplying the ratio selected by the computer 58 by four for one computer cycle and then by two for the next several cycles as shown at points J and K in FIG. 2. The signal from the $ON_2$ programmer 112 is also delivered to the event timer 124, which is stopped and restarted.

Normally the $ON_2$ command results in sufficient deceleration of the wheel to produce one of the conditions signalling a further brake OFF command and consequent full brake release. The $ON_2$ programmer 112 is so constructed that at the end of seven computer counts (280 ms) it doubles the commanded pressure ratio if the preexisting pressure ratio is insufficient to decelerate the wheels. Since an OFF command normally occurs before the second doubling, it is not shown in FIG. 2. As soon as the wheel deceleration resulting from the $ON_2$ command pressure reaches a value of $-5$, the brake OFF command is again generated commanding full brake release as at point L, FIG. 2.

The brake OFF command will persist until the wheel acceleration reaches a value of 4 at which time the $ON_1$ signal will again be generated as at point H, FIG. 2. In the assumed example, $K_{OLD}$ equals $\frac{1}{8}$, and $A_{DN}$ equals $-6$. Accordingly, the ratio computer 58, acting in accordance with the table given above, will select a pressure ratio of 1/16 which, as before, is doubled as at point H, FIG. 2, during the first computer cycle before assuming its steady state value. As soon as synchronous speed is achieved, the $ON_2$ program will be initiated as at point I, FIG. 2, doubling the $ON_1$ pressure ratio, in the assumed example.

The cycle is repeated until the vehicle comes to rest or the operator removes excessive brake pressure.

The braking cycle illustrated in FIG. 2 and described above is typical for a vehicle which is lightly loaded or is traveling on a low coefficient surface. Under these conditions the initial wheel deceleration may be very high and the rate of wheel spin up following the brake OFF signal may be relatively low. Under these conditions the control system delays reapplication of the brakes until actual appreciable wheel spin up has been noted as indicated by wheel acceleration equal to or greater than 4.

If the vehicle is heavily loaded and traveling on a high coefficient surface, the wheel spin up is very rapid following the brake OFF signal. Under these conditions it is particularly important to initiate brake reapplication as soon as possible to minimize stopping distance, as well as to prevent jerky or uneven braking.

To accomplish this, the control system bypasses the $ON_1$ program and initiates the $ON_2$ program primarily as a function of time in the following manner.

The $ON_2$ program may be initiated when the AND gate 126 is opened. The gate receives an input from the AND gate 116 indicating that the brake OFF signal has been generated. The second input to AND gate 126 is derived from the event timer 124 which supplies an input to the gate 126 on timer counts of $C_{12}$, $C_{11}$, or $C_{10}$. Input to the gate 126 is also supplied from the device 122 whenever the value of $K_{OLD}$ is equal to or greater than $\frac{1}{4}$.

The final input to the gate 126 is derived from a circuit which reflects the velocity $V_N$ of the non-selected or slower wheel primarily to inhibit the $ON_2$ signal when the slower wheel is in a locked or nearly locked condition. For example, the velocity $V_N$ of the non-selected wheel is delivered to a detector 130 which transmits a signal to the OR gate 132 and to the AND gate 126 whenever the velocity of an unselected wheel in any computer cycle is equal to or greater than 6. The signal from the unit 130 is also delivered to a storage device 134 which stores the output of the device 130 for two computer cycles and then transmits it to the OR gate 132.

The OR gate 132 may also receive an input from the unit 136 which indicates the velocity of the selected wheel during the previous brake cycle. The action of the device 136 is initiated upon receipt of a signal from the AND gate 116 indicating a brake OFF signal and it is reset and reactuated upon receipt of each succeeding brake OFF signal. The device 136 is supplied with a signal from the unit 138 if the selected wheel velocity is not greater than 12 at any time during a brake cycle. The symbol $\overline{VSU>12}$ in device 138 states the foregoing symbolically. If, during any portion of a braking cycle, the wheel velocity is not in excess of 12 the device 136 will be set and when it receives a triggering impulse from the next brake OFF signal it will transmit a signal to the AND gate 139 which is satisfied at a timer count $C_{12}$.

When the AND gate 126 is opened, a signal is transmitted through the OR gate 140 to the $ON_2$ programmer 112 and through the OR gate 110 to the ratio multiplier device 108. The signal from the $ON_2$ programmer 112 is also delivered to the event timer 124 which is stopped and restarted. The device 108 responds to the initial signal from the $ON_2$ programmer by doubling the ratio selected by the ratio computer 58. When the event timer 124 reaches a count of $C_6$, the output of the programmer 112 is changed and the unit 108 responds by changing the ratio selected by the computer 58 to the next higher level.

The output of the device 108 is transmitted to the device 102 to set K to the proper value which then establishes the proper duty cycle for the solenoid 21 or 21'.

Accordingly, as the $ON_2$ programmer is activated under the conditions described above, the brakes will be partially reapplied 80 ms, 120 ms, or 160 ms after the brake OFF signal.

When low wheel velocity is detected, the system distinguishes between situations in which the vehicle is coming to rest in which case full brake application is required and situations in which the low velocity at the wheel is occasioned by a locked wheel when the vehicle is traveling at substantial speeds, in which case brake release is required.

Assuming that a condition of wheel speed less than 3 is noted by the unit 90, and the low velocity inhibit (LVI) unit 146 is not set, the AND gate 96 will be satisfied and the low velocity OFF device 150 will transmit a signal to the OR gate 118 and the device 120 will transmit an over-riding brake OFF signal to the exclusive OR gate 114. If the vehicle is traveling at substantial speed, and V less than 3 signal represents a wheel lock condition, the wheels will accelerate and when the value of acceleration is equal to or greater than 4 the $ON_1$ program will be initiated, reapplying the brakes.

If, on the other hand, the V less than 3 signal indicates that the vehicle speed as well as the wheel speed is low, the LVI unit 146 will be set eliminating the low velocity OFF signal through the NOT gate 148 and signalling full brake application through the AND gate 70 provided that the wheels are also at synchronous speed as detected by the unit 66. Experience has shown that the conditions necessary to set LVI and synchronous wheel speed can occur together only when the vehicle is nearly stopped.

The LVI unit 146 is initially set when the AND gates 92 and 94 are satisfied. The AND gate 94 is satisfied when velocity is less than 3, deceleration has been greater than −8 as noted by the unit 61, and the LVI unit has not previously been set. The high deceleration signal is supplied to the gate 94 since wheel deceleration equal to or greater than −8 can be experienced only when the vehicle is traveling at substantial speed. The AND gate 92 is satisfied when the signal is received from the OR gate 152 which occurs either when the AND gate 94 has been satisfied or when the LVI unit has been set and also receives a signal $V_S$ less than 6 from the unit 88 and a signal from the NOT gate 15 indicating that the GO unit 156 has not been set. This latter unit is set by a signal from the AND gate 70 when the wheels have reached synchronous speed as indicated by the unit 66 and the output of the LVI unit 146 is true.

Accordingly, assuming that the wheel speed frops drops a count of 3, after maximum deceleration greater than −8 has been detected, the low velocity OFF unit 150 will be activated and the brakes will be released. The LVI unit 146 will also be set and will remain set because of the latching OR gate 152. As soon as the wheels reach synchronous speed, as detected by the unit 66, which can occur simultaneously with the setting of the low velocity inhibit only when the vehicle is nearly stopped, the K equals 1 unit 157 will be activated calling for full brake application. Simultaneously, the low velocity OFF signal from the unit 150 will be discontinued because of the NOT gate 148. When the AND gate 70 is satisfied, the GO unit 156 will be set and through the NOT gate 154 will terminate the signal from the LVI unit 146 thus, essentially, restoring the brakes to operator control.

The LVI signal is also terminated if the wheel speed rises above 6 which will enable the control system to place the brakes in the appropriate mode as described above. It will be noted that if wheel speed rises above 3 but not above 6 and then subsequently falls below 3, the LVI signal remains in effect and the low velocity OFF signal from the unit 150 will be inhibited.

Normally the faster wheel is chosen as a control base since it is presumed to be faster, under braking, because it is rolling on a higher traction surface and is thus retarding the vehicle more effectively than the slower wheel.

If both wheels are operating on the same type of surface, variation in wheel deceleration will be produced by mechanical factors such as the condition of the tire, the condition of the brakes, etc. If the slower wheel were used as the principal control parameter, the possibility of premature release of the brakes at a wheel rotating within acceptable slip limits is created.

However, it is undesirable to base performance of the control system entirely on the action of the faster wheel. For example, if the brakes are effective to decelerate one wheel but not the other, one wheel may be locked while the other rolls with the brake applied. Under these circumstances, a system which selects data from the high velocity wheel only would not relieve brake pressure even though one wheel were fully locked.

The system of the present invention continuously monitors the action of both wheels and usually selects as a control base the faster wheel.

Each brake OFF or GO signal is transmitted through OR gate 160 to the high-low velocity detector 50. Upon receipt of these signals the unit 50 receives an input from the subtract unit 56, the output of which is $V_N - V_S$ or $V_S - V_N$. If $V_N - V_S \geq 6$, the detector 163 transmits a signal to the unit 50 which activates switch 52 so that $V_S$ is representative of the now faster wheel.

However, when a substantial difference in the velocity of the two wheels is noted, velocity data from the slower wheel is used to relieve the brakes momentarily which is sufficient to unlock the lagging wheel under most conditions. Also under some conditions, both wheels may initially decelerate rapidly under full braking at a rate which creates objectionable wheel slip. However, the brake OFF periods may be insufficient to let the low velocity wheel reach or approach synchronous speed. When the system detects such a condition, the reapplication of brake pressure is delayed to permit the slower wheel to regain speed.

Referring again to FIG. 3, it will be noted that AND gate 158 is opened whenever the event timer 124 is not at a count of 10–13 when a signal is received from OR gate 165 indicating that the system is either in the $ON_2$ mode or in the GO mode, the latter indicating that the system is not modulating the brake pressure and when a signal is received from detector 164 indicating $V_S - V_N \geq 8$.

When the AND gate 158 is opened, indicating a wheel speed difference greater than 8, the OR gate 82 will transmit a signal producing a K=0 signal which places the system in the brake OFF mode and restarts timer 124. The $ON_2$ mode is established when the non-selected wheel reaches a velocity equal to or greater than 6 as indicated by device 130 or the selected wheel reaches synchronous speed as indicated by device 66.

If the velocity difference persists, the cycle will be repeated. Usually this is sufficient to unlock the lagging wheel. However, it is not intended to be sufficient if the lagging wheel is rolling on ice when the opposite wheel is rolling on a high coefficient surface. The pressure reduction required to achieve this objective would produce an unacceptable increase in stopping distance.

The performance of the non-selected or slower wheel is also used under certain conditions, in the event that the brake OFF periods are not sufficiently long to let the low velocity wheel accelerate to reach a speed $V_N$ of at least 6 (5 mph).

Under these conditions the OR gate 132 will not receive signals from the units 130 and 134 thus not initiating the $ON_2$ program. The $ON_1$ program will then be initiated when the acceleration of the faster wheel reaches a value of 4 or greater at which time the slower wheel usually will have also experienced substantial acceleration.

The system is constantly responsive to wheel acceleration and deceleration and since all conditions which significantly affect braking, such as a change in the pressure signalled by the operator or change in road surface conditions are reflected in changes in wheel acceleration or deceleration, the system constantly responds and exercises the proper control in response to any factor which significantly affects braking performance.

For example, if, after the initiation of the braking cycle on a high coefficient surface, the vehicle passes on to a low coefficient surface, after the $ON_1$ command is made, the commanded brake pressure will be temporarily excessive, resulting in wheel deceleration. Accordingly, the system will command brake OFF rather than $ON_2$.

Conversely, if the vehicle passes from a low traction surface to a high traction surface after the generation of the $ON_1$ command, the wheel will accelerate rapidly toward synchronous speed producing on $ON_2$ command. If the commanded pressure is insufficient to produce the brake OFF command after seven computer cycles (280 msec), the multiplier 108 will double the $ON_2$ command pressure and, if during the period of six additional computer cycles (240 msec) a brake OFF command is not produced, the multiplier 108 will restore full brake pressure called for by the operator. The application of full pressure will produce one of the conditions calling for a further brake OFF signal unless the operator is not calling for excessive brake pressure under the then existing conditions.

At the completion of any braked stop all the components will be reset to their initial start condition. The circuitry for effecting the basic reset is wholly conventional and has been omitted for clarity.

Also through the use of conventional circuitry the system is made fail safe, i.e., maintains the solenoid 21 and 21' off under any of several conditions. For example, the system is self-deactivated if the system commands zero brake pressure for more than 4 seconds, or if the signal derived from the solenoid 21 and 21' does not match the pressure commanded or if the power to the system fails.

The system is also self-deactivating in the event of sensor failure.

I claim:

1. A machine method for augmenting braking control of a braked wheeled vehicle employing fluid pressure operated brakes comprising the iterative steps of
    commanding pressure release of the brakes of at least one wheel in response to either
        deceleration thereof reaching a first deceleration level, or
        deceleration thereof reaching a lower second deceleration limit and a preselected velocity limit thereof,
    whereby said wheel is permitted to accelerate;
    commanding at least partial restoration of braking pressure to said brake at a first pressure level less than an applied pressure in response to
        acceleration of said wheel reaching a preselected positive acceleration limit, or
        after a preselected minimum time duration of said condition of positive acceleration,
    increasing the commanded partial braking pressure in response to said wheel reaching synchronous speed, and
    further increasing the commanded braking pressure in response to a preselected minimum time duration of said condition of synchronous speed.

2. The method of claim 1 in which second step of commanding a partial restoration of braking pressure is performed in response, alternatively, to
    the acceleration of said wheel reaching a preselected positive acceleration limit,
    after a preselected minimum time duration of said condition of positive acceleration, and
    a stored previous value of maximum deceleration of said wheel equalling or exceeding a second preselected deceleration limit.

3. The method of claim 2 in which there is further included the antecedent steps of
    periodically comparing the velocities of the wheels of a common axle of said vehicle;
    selecting the higher velocity wheel of said wheels of a common axle in response to a first preselected velocity difference between said wheels of said common axle;
    commanding said release and application of said brake pressure for the brakes of said wheels of said common axle in response to the acceleration, deceleration and velocity states of said selected wheel; and
    inhibiting the brake pressure restoration command during the occurrence of at least a preselected second velocity difference between said wheels of said common axle and larger than said first difference.

4. The method of claim 1 in which said first pressure level of said step of commanding partial restoration of braking pressure, is determined from the pressure command condition existing upon initiation of said step of commanding pressure release.

5. The method of claim 1 in which said first pressure level of said step of commanding partial restoration of braking pressure is determined from both
    the pressure command condition existing upon initiation of said step of commanding pressure release, and the subsequent peak wheel deceleration prior to said step of commanding restoration of braking pressure.

6. The method of claim 1 in which said first pressure level of said step of commanding partial restoration of braking pressure is further determined from the subsequent peak wheel deceleration prior to said step of commanding restoration of braking pressure.

7. An iterative machine method for augmenting braking control of a braked wheeled vehicle employing fluid pressure operated brakes comprising the iterative steps of commanding pressure release of the brakes of at least one wheel in response to either deceleration thereof reaching a first deceleration level, or deceleration thereof reaching a lower second deceleration limit and a preselected velocity limit thereof, whereby said wheel is permitted to accelerate;

commanding at least partial restoration of braking pressure to said brake at a first preselected pressure level less than an applied pressure and as a function of the pressure command condition of the prior iteration and in response to acceleration of said wheel reaching a preselected positive acceleration limit, or after a preselected minimum time duration of said condition of positive acceleration;

increasing the commanded partial braking pressure in response to said wheel reaching synchronous speed; and further increasing the commanded braking pressure in response to a preselected minimum time duration of said condition of synchronous speed.

* * * * *